United States Patent [19]

Wu et al.

[11] Patent Number: 5,548,671

[45] Date of Patent: Aug. 20, 1996

[54] PROGRAMMABLE, DIFFERENTIAL WAVELENGTH DISCRIMINATOR

[75] Inventors: Chi Wu, Nepean; Ernst A. Munter, Kanata, both of Canada

[73] Assignee: Northern Telecom Limited, Montreal, Canada

[21] Appl. No.: 322,140

[22] Filed: Oct. 13, 1994

[51] Int. Cl.$^6$ .................................................. G02B 6/34
[52] U.S. Cl. ............................................ 385/37; 385/45
[58] Field of Search .............................. 385/10, 18, 37, 385/45

[56] References Cited

U.S. PATENT DOCUMENTS

| | | | |
|---|---|---|---|
| 4,747,654 | 5/1988 | Yi-Yan | 385/45 |
| 4,820,009 | 4/1989 | Thaniyavarn | 385/45 |
| 4,860,294 | 8/1989 | Winzer et al. | 385/45 |
| 4,938,553 | 7/1990 | Maerz et al. | 385/37 |
| 5,363,226 | 11/1994 | Strasser et al. | 385/37 |
| 5,434,702 | 7/1995 | Byron | 385/10 |
| 5,469,520 | 11/1995 | Merey et al. | 385/37 |
| 5,473,714 | 12/1995 | Vengsarkar | 385/37 |
| 5,475,780 | 12/1995 | Mizrahi | 385/37 |

OTHER PUBLICATIONS

"Digital Optical Switch", Silberberg et al, Appl. Lett., 51(16), 19 Oct. 1987, pp. 1230–1232.

"Low–Crosstalk 2x2 Digital Optical Switch", Okayama et al, Electronics Letters, 3rd Mar. 1994, vol. 30, No. 5, pp. 403–405.

"First Digital Optical Switch Based On InP/GaInAsP Double Heterostructure Waveguides", Cavailles et al, Electronics Letters, 25th Apr. 1991, vol. 27, No. 9, pp. 699–700.

"Integrated Optics 4x4 Switch Matrix With Digital Optical Switches", Granestrand et al, Electronics Letters, 4th Jan. 1990, vol. 26, No. 1, pp. 4–5.

"A Very Low Operation Current InGaAsP/InP Total Internal Reflection Optical Switch Using p/n/p/n Current Blocking Layers", Oh et al, IEEE Photonics Technology Letter, vol. 6, No. 1, Jan. 1994, pp. 65–67.

"Integrated Optics Components and Devices Using Periodic Structures", Suhara et al, IEEE Journal of Quantum Electronics, vol. QE–22, No. 6, pp. 845–867, Jun. 1986.

"Integrated Grating Circuit for Guided–Beam Multiple Division Fabricated by Electron–Beam Direct Writing", Handa et al, Optics Letters, Jul. 1980, vol. 5, No. 7, pp. 309–311.

"Monolithic Integrated Microgratings and Photodiodes for Wavelength Demultiplexing", Suhara et al, Appl. Phys. Lett., 40(2), 15 Jan. 1982, pp. 120–122.

*Primary Examiner*—Rodney B. Bovernick
*Assistant Examiner*—Robert E. Wise
*Attorney, Agent, or Firm*—George MacGregor

[57] ABSTRACT

A programmable wavelength discriminator for isolating individual wavelength carriers from an optical signal including a plurality of wavelength carriers. The discriminator preferably has a pair of waveguides, with each waveguide having imprinted therein a reflecting grating whose period is chosen to reflect the wavelength to be isolated. A receiver such as a photodetector interrogates the selected wavelength. A programmable optical switch determines through which waveguide the composite optical signal will travel. A method of isolating discrete wavelengths from an optical signal comprising a plurality of wavelengths is also discussed.

10 Claims, 4 Drawing Sheets

PROGRAMMABLE, DIFFERENTIAL WAVELENGTH DISCRIMINATOR

FIELD OF INVENTION

This invention relates to optical waveguides and more particularly such waveguides capable of providing programmable wavelength discrimination.

BACKGROUND

The range of wavelengths propagated by optical fibers and waveguides is such that this medium is well suited to broadband, long haul communications. Optical fibers, for example, have a low loss window in the 1.3 to 1.55 μm range such that properly designed optical transmission systems can transfer optical signals over long distances without intermediate repeaters. Although optical fibers can transmit bandwidths at or approaching the Tera bit range, limitations such as electronic circuitry prevent full utilization of this characteristic. Thus, to more fully exploit this bandwidth capability, it is known to divide the optimum wavelength range into wavelength channels and to impress multiple data streams onto those channels.

By this process, known as wavelength division multiplexing (WDM), parallel data chains carried on separated wavelength channels are launched into an optical fiber and subsequently demultiplexed at the receiver end into the same wavelength channels.

It is also possible to employ multiple wavelengths in switching. For example, tunable laser transmitters can be tuned to different wavelengths and data transmission from each transmitter is mixed together optically on a fiber. At the receiver end the transmission is separated again using fixed wavelength discriminating optical filters and conventional photodetectors. In this system switching is achieved simply by tuning each transmitter to the wavelength of the intended receiver, rather like a broadcast radio system but in reverse. In other such systems of this kind both the transmitter and receiver or the receiver alone can be tuned over a range of wavelengths. Optionally, optical devices, capable of changing the wavelength of light, can be used.

Another example of the use of wavelength division in switching is analogous to the Code Division Multiplex System (CDMA or "spread spectrum") technique used in certain mobile radio telephone systems. In the present optical case, each channel transmitted into the optical bus contains a number of wavelengths in a pattern that is different from the pattern of every other transmitter. Reception of a selected channel is achieved by correlation of the expected pattern (spectrum shape) with the received signal which contains both the desired pattern as well as all other transmissions. By a proper choice of the spectral pattern, one can achieve separation of the desired signal because all other signals appear as noise. In effect the noise has a low correlation coefficient with the expected pattern while the desired signal exhibits a high correlation.

In order to maximize the information transfer within the aforementioned low loss window, as many wavelength channels as possible are utilized. This, of course, requires narrow optical bandwidth of each channel and good separation between channels.

The development of such transmission systems has been hampered by the lack of optical components which economically generate, detect, separate and convert optical wavelengths in a narrow range.

Heretofore, optical systems have relied on free space optics with gratings and lenses followed by semiconductor detectors. Spatial wavelength separation has been accomplished by integrated waveguide optics relying on the diffractive effect of multi-path interference. Other prior art optical components have relied on light coupling through index matching of parallel waveguides as well as programmable holograms and acousto-optical tunable filters.

SUMMARY OF INVENTION

The present invention seeks to provide a class of devices which simplifies the detection and discrimination of optical signals at different wavelengths in a programmable and integrated way.

The invention also seeks to provide such devices utilizing integrated circuit manufacturing methods which are well understood for high volume manufacturing of precision parts.

Therefore, in accordance with a first aspect of the invention, there is provided a wavelength discriminator having a waveguide adapted to receive an optical signal on a carrier of a discrete wavelength. A grating having a pre-selecting grating period is on the waveguide, the grating period being selected to reflect the discrete wavelength. A receiving means is associated with the grating to receive the wavelength reflected by the grating.

According to a second aspect of the invention the waveguide is adapted to receive an optical signal having a plurality of wavelengths while the grating is selected to reflect only one of the plurality of wavelengths.

According to another aspect of the invention the discriminator is provided with a pair of waveguides and an upstream optical switch to programmably direct the optical signal to one of the waveguides, At least one of the waveguides is provided with a grating to reflect a preselected one of the plurality of wavelengths to its associated receiving means, In yet another aspect of the invention, wavelength discriminators are connected in cascade so that several or all of the wavelengths in the incoming optical signal can be received by individual receivers. In a preferred embodiment the receivers are photodetectors.

In accordance with a further important aspect of the invention there is provided a method of isolating an optical carrier of a selected wavelength from an optical signal containing a plurality of optical carriers of different wavelengths, The method comprises launching the optical signal into a waveguide which is provided with an optical grating having a grating period to reflect the selected wavelength. The optical signal is caused to propagate through the grating whereby the selected wavelength is separated from the stream of wavelengths. A receiver in association with the grating accepts the selected wavelength for further processing. The receiver may comprise an optical detector or a second grating of the same period as the first so as to reflect the selected wavelength into a receiving waveguide. The method also extends to the isolation and detection of two or more carriers of different, selected wavelengths from the multi-carrier optical signal.

BRIEF DESCRIPTION OF THE DRAWINGS

The invention will now be described in greater detail with reference to the attached drawings wherein.

DETAILED DESCRIPTION OF THE INVENTION

Figure 1:
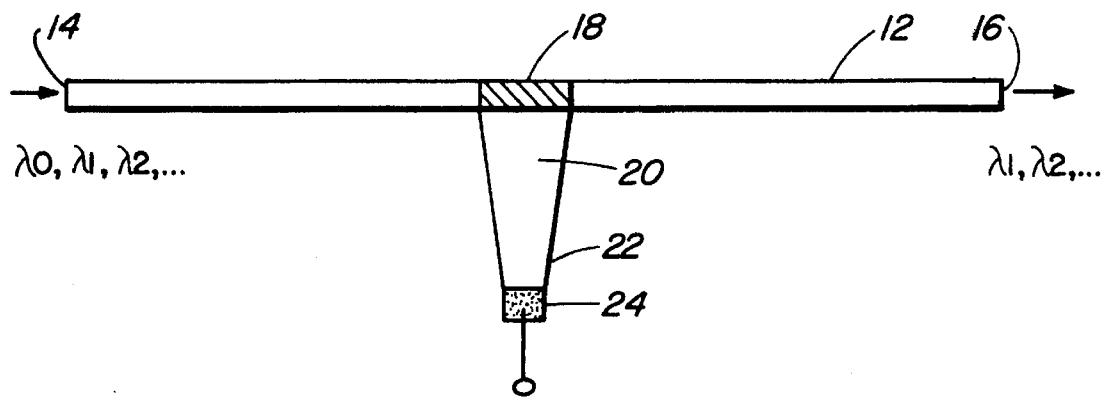
FIG. 1 is a plan view of a basic wavelength discriminator.

The invention in its simplest form is shown in FIG. 1. A waveguide 12 is configured to receive and transfer therethrough an optical signal including a plurality of wavelengths $\lambda_0, \lambda_1, \lambda_2, \ldots \lambda_n$. The waveguide 12 is of a single mode configuration fabricated from suitable electro-optic, acousto-optic or photo-refractive materials. Of particular interest in this regard is Lithium Niobate, silicon, glass, etc., and more particularly, semiconductor materials such as III-V alloys, the latter being of interest because it can be processed by well-known semiconductor processing procedures and because of possible integration with photodetectors, optical amplifiers and other optoelectronic components.

Waveguide 12 has an input end 14 and an output or exit end 16. Spaced between opposite ends of the waveguide is a Bragg reflector 18 comprising a plurality of perturbations formed by well-known means such as wet etching. It is within the scope of the present invention to generate the diffraction gratings in other ways such as: electro-optic effect; thermal effect; acousto-optic effect; or holographic effect. The period of the perturbations on the grating 18 is selected to reflect a chosen wavelength. The period $\Lambda$ is in compliance with the following equation:

$$\Lambda = \frac{\lambda}{2N \sin \theta} \quad (\text{EQ 1})$$

where $\lambda$=wavelength to be reflected,

N=effective refractive index of the waveguide, defined as $$\frac{\beta}{\left(\frac{2\pi}{\lambda}\right)},$$

where $\beta$ is the propagation constant of the waveguide, $\theta$=incident angle.

Associated with the grating 18 is a waveguide such as tapered waveguide 20 which confines the reflected light into a narrow region 22 where, in one embodiment, it is detected by photodetector 24.

In the embodiment illustrated in FIG. 1, the grating has a period $\Lambda_0$ which reflects wavelength $\lambda_0$. The remaining wavelength carriers $\lambda_1, \lambda_2, \ldots \lambda_n$ continue through the waveguide 12 to exit through end 16.

Figure 2:
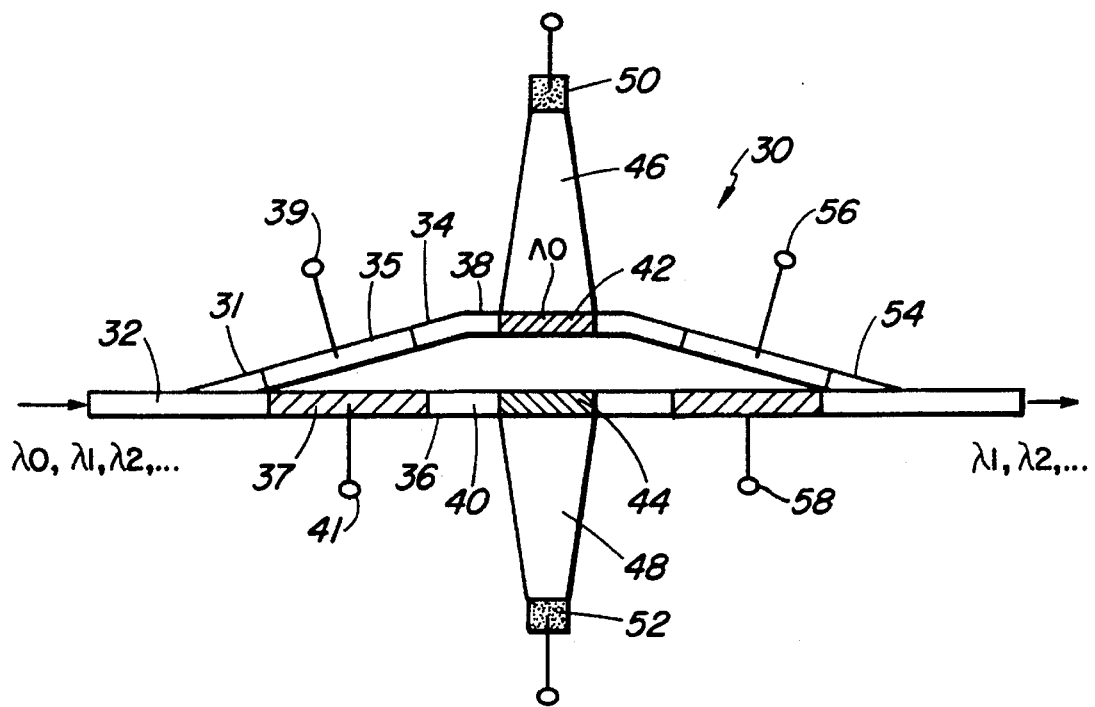
FIG. 2 is a plan view of a dual-waveguide wavelength discriminator.

FIG. 2 illustrates a wavelength discriminator 30 having the capability of optionally isolating more than one wavelength carrier from the range of carriers launched into the discriminator. In FIG. 2 an optical switch in the form of a Y-branch guide is formed at the input end of the device. As shown, the optical switch 31 has a single input end 32 and a pair of branch arms 34,36. Branch arms 34 is coupled to a first waveguide 38 and branch arm 36 is coupled to a second waveguide 40. The branch arms are provided with electro-optic means 35,37 respectively to permit the refractive index of each branch to be varied. The electro-optic means in a preferred embodiment comprise electrical contacts and terminals 39,41 respectively to allow a biasing voltage or current (positive and/or negative) to be applied independently to each arm. The switch, without bias voltage or current, functions as a 3-dB coupler so that an optical signal $\lambda_0, \lambda_1, \lambda_2, \ldots \lambda_n$ launched into the switch is divided substantially equally between the two arms. If, however, a bias is applied to arm 34 the refractive index of this arm will decrease and the beam or optical signal is switched into branch arm 36. Conversely, if a bias is applied to arm 36, the optical signal is switched to arm 34. Although FIG. 2 shows an optical switch in the form of a Y-branch guide it is to be understood the Other switches such as directional couplers, X-switches, or "normally on" Y-branch switches can also be used. A "normally on" switch has a straight through arm with an electrode and a branch arm without an electrode. Without voltage applied to the electrode, light goes through the straight arm. With voltage applied light is switched to the branch arm.

A grating may be incorporated in one or both of the waveguides. Further, the grating can have the same or different period $\Lambda$. In the case of a grating in only one waveguide, the period may be selected to reflect, for subsequent detection, only a single wavelength of interest. Thus the wavelength can be isolated by switching the optical signal through the waveguide with the grating. If no isolation is required the optical signal is propagated through the waveguide with no grating.

A second option is to incorporate gratings in both waveguides such as waveguide 38,40 which have 45 degree reflecting gratings 42,44 respectively (FIG. 2). The period $\Lambda$ of each grating may be different such that one grating will reflect one of the wavelength of the optical signal and the other grating will reflect another wavelength. For example grating 42 could have a period $\Lambda_0$ and grating 44 a period $\Lambda_1$ such that grating 42 reflects $\lambda_0$ and grating 44 reflects $\lambda_1$. In any event, associated with each grating 42,44 is a tapered waveguide 46,48 respectively. The tapered waveguides 46,48 direct the reflected wavelength to photodetectors 50,52 respectively. Thus, by controlling the bias on the branch arms of the optical switch the incoming optical signal may be directed to either waveguide wherein the desired wavelength is isolated from the range of wavelength carriers which make up the optical signal. The remaining wavelengths pass through the waveguides and exit the device via exit Y-branch unit 54.

As shown in FIG. 2 the waveguides are united at the exit end by a Y-branch combiner 54. The combiner may also be provided with electro-optical means such as contacts 56,58 to facilitate the transfer of the optical signal through the discriminator. By varying the bias voltage on the output arms of the combiner the relative phase of the outputs can be varied. The contacts on the output branches also provides for bi-directional use of the discriminator.

Figure 3:
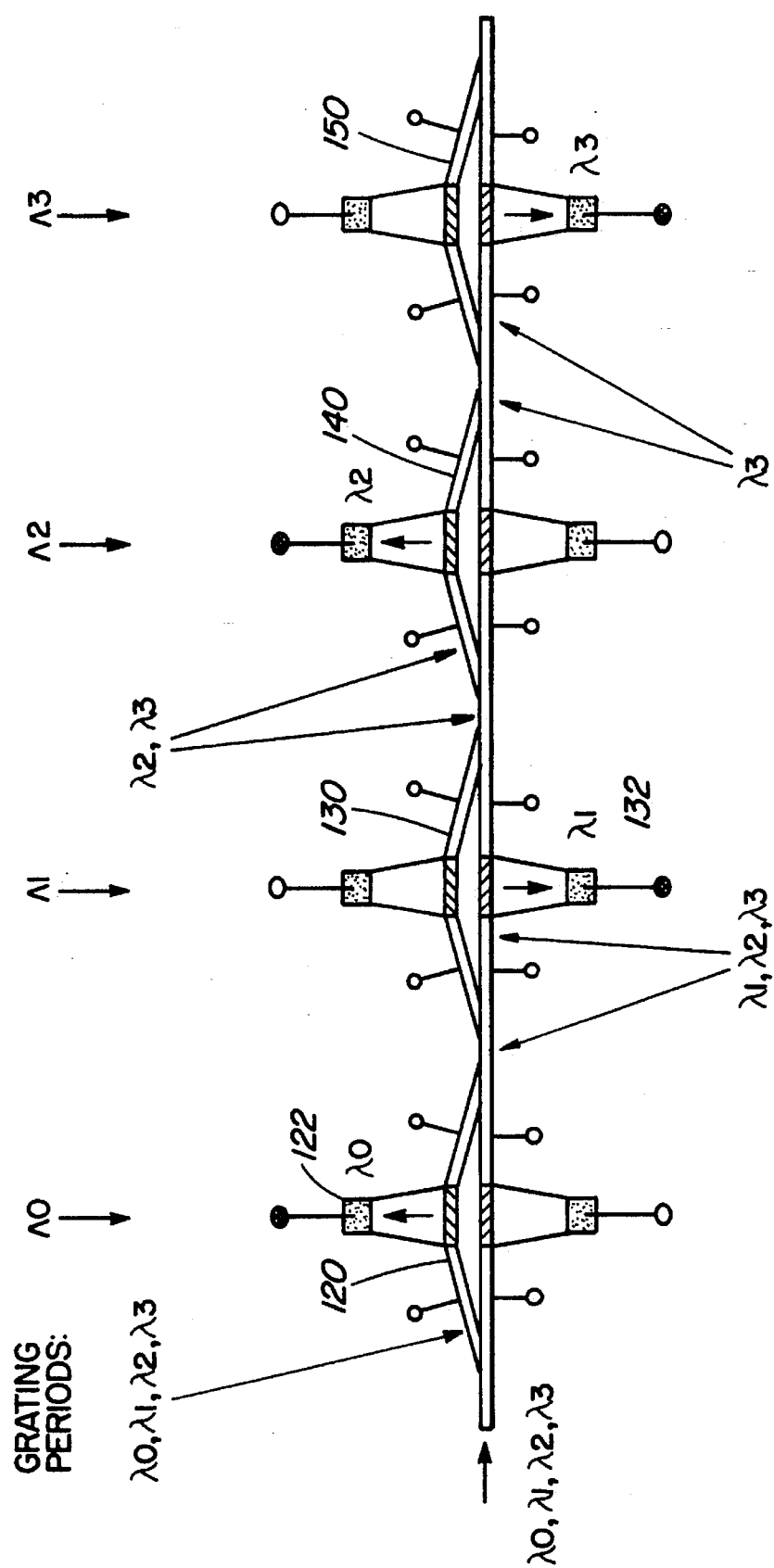
FIG. 3 is a plan view of wavelength discriminators in cascade.

In a particularly important embodiment of the invention discriminators such as those shown in FIG. 2 can be connected in cascade as illustrated in FIG. 3. The reflecting grating of each discriminator will have a different period, each selected to preferentially reflect one of the many wavelengths which make up the composite optical signal. In the example depicted in FIG. 3, the optical signal launched into the structure comprises wavelengths $\lambda_0, \lambda_1, \lambda_2$ and $\lambda_3$.

The period of the grating in the first unit 120 is $\Lambda_0$ which reflects $\lambda_0$. Hence this wavelength is detected by detector 122. The grating period of the second unit 130 is $\Lambda_1$ and $\lambda_1$ is thus detected by detector 132.

The third and fourth units 140,150 are configured to detect $\lambda_2$ and $\lambda_3$ so that all of the wavelengths on the optical signal are detected individually. It will be apparent to one skilled in the art that the combinations of the wavelengths in either side can be achieved arbitrarily by choosing different biasing combinations in each unit. It is also within the scope of the invention to interconnect the detectors on one or both sides to give a sum of the photocurrent for selected wavelengths. This application is comparable to a programmable mask in CDMA.

It is further contemplated by the present invention that the cascaded arrangement of FIG. 3 is configured such that the gratings in both waveguides within a discriminator unit have the same period. Thus, in the event of an incomplete transfer of the optical signal to the selected waveguide, the portion of the signal propagating through the un-selected waveguide having the selected wavelength can be detected and appropriately processed; i.e., it can be added to or subtracted from the detected signal in the selected waveguide.

Figure 4:
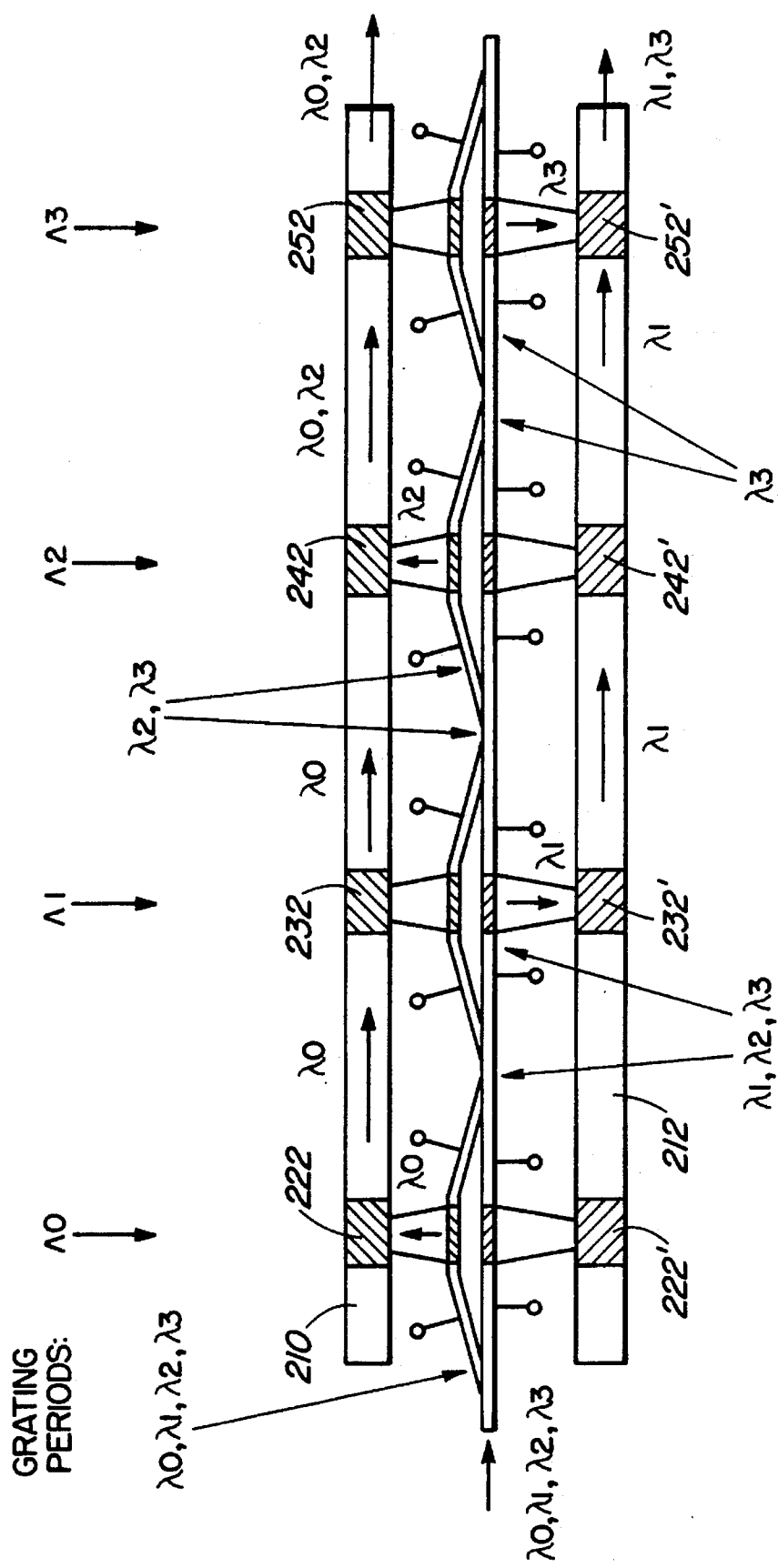
FIG. 4 is a plan view of wavelength discriminators in cascade having receiving waveguides.

Another embodiment of the present invention is illustrated in FIG. 4. In this structure the photodetectors associated with each tapered waveguide as discussed in relation to FIG. 3 are replaced with gratings 222,232,242,252 each having the same period as the associated grating in the waveguide. This additional grating has an angle of reflection so as to direct the reflected wavelength into second waveguides 210,212. In a preferred structure the angle of reflection of the second grating is 45° so that the second waveguides 210,212 are parallel to the main waveguide. The reflecting gratings 222,232,242,252 can also be configured such that the beam propagates in the second waveguide 210 or 212 codirectional with the optical signal although it is to be understood that the reflected light can be directed in an contra-directional path. With this configuration the discriminator can be programmed to multiplex selected wavelengths in one waveguide and all remaining wavelengths in the other.

Figure 5:
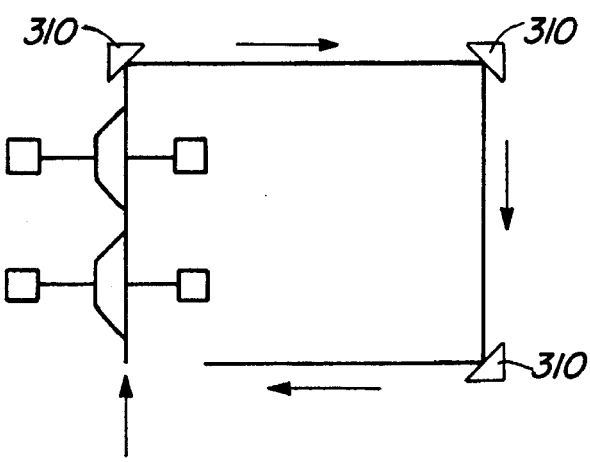
FIG. 5 is a representation of a cascaded discriminator in a rectangular path.
Figure 6:
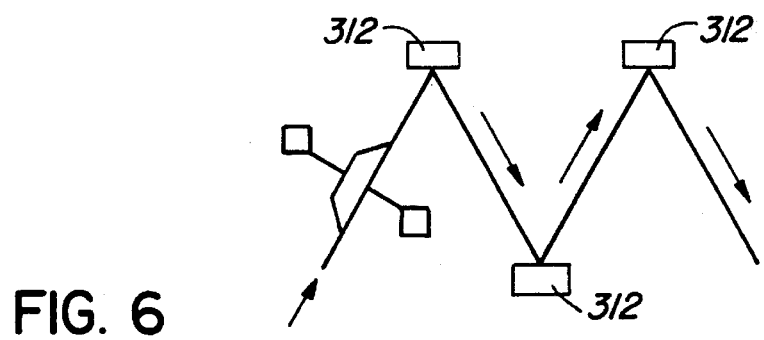
FIG. 6 is a representation of a cascaded discriminator in a zig-zag path.
Figure 7:
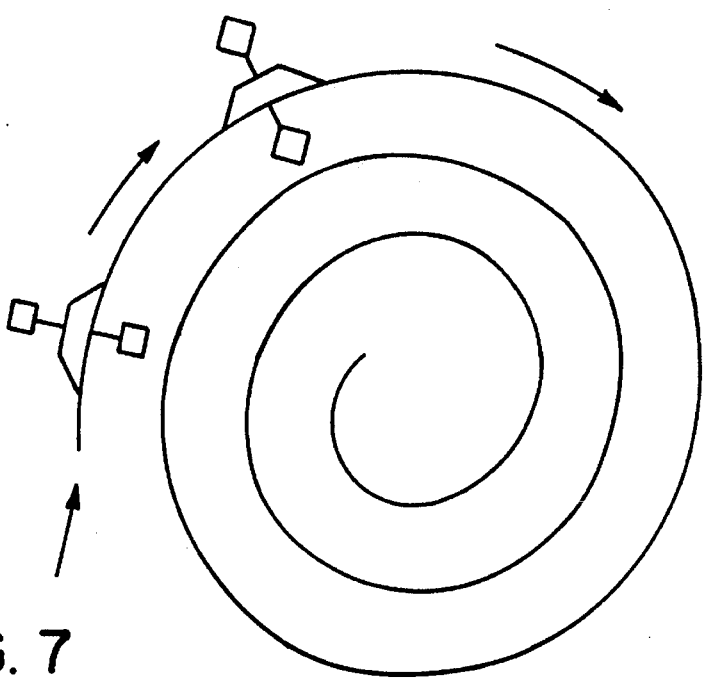
FIG. 7 is a representation of a cascaded discriminator in a spiral path.

Other combinations of cascaded discriminators are possible including serial and/or parallel configurations. Also, one side of the cascaded device can have a collector waveguide as shown in FIG. 4 while the other side has photodetectors as shown in FIG. 3. Further, in addition to a straight path as shown in FIGS. 3 and 4, the discriminator can be a square or rectangular path with corner mirrors 310 as shown in FIG. 5, zig-zag with mirrors 312 as shown in FIG. 6 or spiral as shown in FIG. 7.

While specific embodiments have been described and illustrated it will be apparent that variations can be made to those embodiments. For example, in the case where a multi-wavelength parallel signal, wherein each signal may be differentially encoded, is received by the discriminator, the discriminator can be programmed to separate the two wavelengths that constitute a bitstream and subtract their intensities from each other to provide a differential decoding function. By cascading a number of differential detector sections for the different wavelength pairs, an integrated receiver for a number of optically multiplexed bitstreams can be provided. A discriminator of the present invention, configured to contain a serial or parallel cascade of several sections provides a means of creating a tunable receiver which can be rapidly reprogrammed to receive different wavelengths. This feature can be used in switching applications such as ATM where existing tunable filters which rely on thermal or mechanical effects are too slow. In the case of a CDMA receiver, the discriminator of the present invention provides a method of automatically collecting all wavelengths of interest in one detector, and all wavelengths of the unwanted signal in a second detector for subsequent comparison and decoding. This is done in a way that permits electronic programming of the desired wavelength sets. It is to be understood, however, that such variations and further examples will fall within the scope of the invention as defined by the appended claims.

We claim:

1. A wavelength discriminator comprising:

a y-branch optical switch having an input end adapted to receive an optical signal having a plurality of discrete wavelengths, and first and second output ends;

first and second waveguides connected to said first and second output ends respectively, said first and second waveguides having control means to control the refractive index thereof so as to direct the optical signal through one of said first and second waveguides;

an optical grating in one of said first and second waveguides, said optical grating having a grating period selected to reflect one of said plurality of discrete wavelengths; and receiving means associated with said grating to receive the reflected wavelength.

2. A wavelength discriminator as defined in claim 1, said control means having electrical contacts to permit selective current injection into one of said first and second waveguides.

3. A wavelength discriminator as defined in claim 2, each of said first and second waveguides having optical gratings, the grating period of each grating being selected to reflect different wavelengths.

4. A wavelength discriminator as defined in claim 3, each of said gratings having receiving means to receive said reflected wavelength.

5. A wavelength discriminator as defined in claim 4, to said receiving means being a photodetector.

6. A wavelength discriminator as defined in claim 4, said receiving means having a tapered waveguide between said grating and said photodetector.

7. A wavelength discriminator as defined in claim 4, said receiving means having a receiving grating of the same grating period as the optical grating to reflect said wavelength into a receiving waveguide.

8. A wavelength discriminator as defined in claim 1, having an output optical combiner with first and second input ends connected to said first and second waveguides respectively and an optical output to transfer out of said combiner wavelengths not reflected by said gratings.

9. First and second wavelength discriminators each as defined in claim 8, with the optical output of said first discriminator connected to the input end of said optical divider and said gratings each having a grating period selected to reflect different ones of said plurality of wavelengths.

10. A plurality of wavelength discriminators each as defined in claim 8, connected in cascade with each waveguide having a grating having a different grating period so as to reflect a different one of said plurality of discrete wavelengths.

* * * * *